Figure 1:
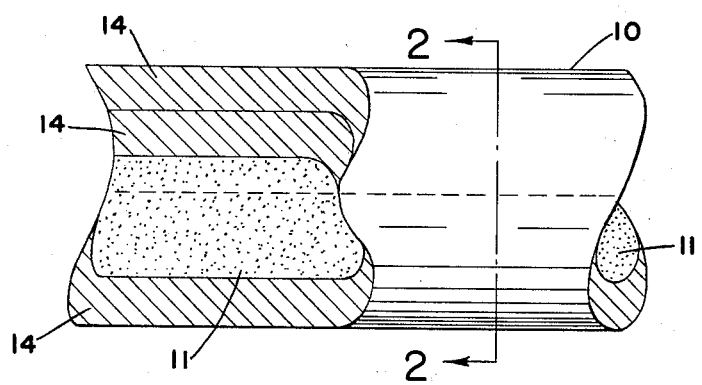

Oct. 20, 1959  G. G. LANDIS ET AL  2,909,778
METHOD AND MEANS FOR BARE ELECTRODE WELDING
Filed June 29, 1956

INVENTORS
GEORGE G. LANDIS &
DONALD M. PATTON
BY
Alfred C. Body
ATTORNEY

United States Patent Office 2,909,778
Patented Oct. 20, 1959

2,909,778

METHOD AND MEANS FOR BARE ELECTRODE WELDING

George G. Landis, South Euclid, and Donald M. Patton, Willowick, Ohio, assignors to The Lincoln Electric Company, Cleveland, Ohio, a corporation of Ohio Application June 29, 1956, Serial No. 594,918

16 Claims. (Cl. 219—146)

This invention pertains to the art of arc welding and, more particularly, to an electrode for and a method capable of electric arc welding in air.

The invention is particularly applicable to electric arc welding in air using a bare steel electrode and will be described with particular reference thereto although it will be appreciated that the invention in some instances, has broader applications.

The invention is also particularly applicable to the arc welding of the magnetic steels and the magnetic steel alloys and will be described with particular reference thereto, although it will be appreciated that the principles which make the invention successful in the welding of steel are, in many instances, also equally applicable to the welding of non-magnetic steels or the non-ferrous metals such as, without limitation: copper, aluminum, titanium and the alloys thereof.

In the art of arc welding of magnetic steel, one of the problems which has long troubled the welder is that of holes or porosity within the weld bead. Various means have been employed to reduce or eliminate such porosity.

Thus, it is conventional to employ an electrode made up of a core of the metal which it is desired to deposit and an external coating of a flux which flux melts down along with the core to shield the arc and form a fluid slag over the molten weld bead or pool made up of the interfused electrode and workpiece metals. Coated electrodes, while used extensively, are of necessity limited in length. Because the coating materials are electrically non-conductive, it is necessary to bare one end of the core so that the electrical connection can be made thereto. With coated electrodes, the coating material is expensive and is ultimately wasted; the hardened slag must be removed from the weld bead, sometimes with difficulty; the unused stub end of the electrode must be thrown away; the deposition rate is low; and, the length of a continuous weld is limited.

It is, therefore, desirable to use, if possible, a long, continuous bare metal electrode and provide other means for protecting the weld. One arrangement is to deposit a pile of granular flux over the desired location of the weld and advance a bare, electrically-energized electrode through this pile and while maintaining an arc thereunder. The flux melts and protects the molten weld metals. Excellent welds can be obtained but this flux is also expensive; is difficult to weld with other than in the down-hand position; is messy; requires a separate flux feed operation; and, requires the recovery of the unused flux and the removal of the hardened slag, sometimes with considerable difficulty. On the other hand, the length of the continuous weld is unlimited and very high deposition rates can be obtained.

Another method for protecting the arc and the molten weld metals is to use an inert gas projected coaxially about the electrode toward the workpiece which inert gas excludes the atmosphere in the vicinity of the weld and enables in certain limited situations satisfactory welds to be obtained. The use of inert gases ordinarily requires a separate source and container for the gas, bulky piping and complicated valving to carry the gas from the container to the welding head and usually artificial cooling for the welding head.

The present invention contemplates and has for its principal object a new and improved electrode and method for arc welding which overcomes all of the above-referred to difficulties and others and enables sound non-porous weld deposits to be obtained.

The present invention also contemplates an electrode having improved means for, and a method for, protecting metals of the electrode as they move through the arc to the weld pool.

By welding "in air" is meant welding without the use of any independent or auxiliary supply of flux, gas or vapor to the vicinity of the arc during the welding. By "bare" is meant an electrode having a continuous metallic surface which can be readily contacted by fixed electrical energizing means as the electrode is fed to the arc.

Without desiring to limit the invention, its success is believed based upon the following theories of operation: Most of the elements, and particularly the metals and carbon, have an affinity for oxygen and will react therewith under certain conditions to form an oxide. By "affinity" is meant the attraction of one element for another to react therewith under appropriate conditions and form a compound.

This affinity may be strong enough that in some instances an element will leave one compound to react with an element in another compound resulting in two new compounds.

The relative affinity a particular element has for oxygen can be predetermined if the free energy of the oxide of that element is known. In general, the lower the free energy per mole of oxygen, the greater the affinity that element has for oxygen. The values for the free energies are reported in the literature.

Certain elements have sufficiently greater affinity for oxygen than others so that, in the presence of oxides of elements of a lower affinity and heat, they react therewith to reduce such oxide to its element and in turn form an oxide of the higher affinity element.

One of the causes of porosity in a deposited steel weld bead is believed due to the element, carbon, which is present in all steels, and the compound, iron oxide, which is present as inclusions in all steels which are of the "unkilled" type, or on the surface of "killed" type steels which have been in storage sufficiently long to have a rust coating form on the surface or as mill scale. Most steels to be welded and almost all electrode steels have iron oxide present in varying amounts. Further, when welding in air with a bare electrode, a principal source of iron oxide is the reaction of the oxygen of the air both with the droplets of electrode metal as they form and move through the arc and with the surface of the molten weld bead, which oxide is principally concentrated on the surface of the molten metal.

In the heat of the arc, carbon, which has a higher affinity for oxygen than does iron, reduces the iron oxide to form elemental iron and carbon monoxide (also sometimes carbon dioxide) a gas with a volume many thousands of times greater than the volume of the carbon and the iron oxide from which it is formed. This carbon monoxide is formed internally of the molten weld bead and is trapped therein as the metal congeals leaving holes or bubbles throughout the weld bead.

If the above is true, then we have reasoned that if we feed a material into the arc and to the molten weld pool (1) having a greater affinity for oxygen than does iron, and (2) forming a solid or liquid oxide at the melting temperature of steel, this material will react with enough iron oxide present to form pure iron and an oxide of the material, such that insufficient iron oxide remains to react, before the bead hardens, with the element, carbon, and form a gas.

Investigation of the affinity of the various metals in the periodic chart of the elements for oxygen indicates that there are generally two groups having the above two characteristics: namely, metals having a greater affinity for oxygen than does iron but less than does carbon, such as manganese, chromium, niobium, tantalum, gallium, and vanadium, which will hereinafter be referred to jointly as "deoxidizers"; and metals having a greater affinity for oxygen than does either iron or carbon, such as hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium, uranium, or alloys thereof which will be referred to jointly hereinafter as "killing agents."

With reference to the deoxidizers, these metals must have the further characteristic that they form an oxide which is insoluble in molten steel. Thus, when they reduce the iron oxide and form an oxide of the deoxidizer, this oxide is not readily available to be reduced by carbon.

With reference to the killing agents, some are extremely rare, are radioactive, or are difficult to introduce into the arc or weld pool. They may thus be disregarded from practical aspects of the invention although they should work.

Actual tests using zirconium, titanium and boron indicated that if a sufficient amount of these metals were employed as a killing agent that solid welds could be obtained while welding in air. However, when welding with aluminum or silicon as the killing agent, the result instead was a very substantial increase in the amount of porosity in the weld bead.

Investigation of this phenomenon in the face of an otherwise satisfactory theory brought forth a point which is important insofar as the present invention is concerned; namely, that all of the killing agents listed reacted with the nitrogen of the air in the heat of the arc to form a nitride of the killing agent, which nitride is then carried into the molten weld bead along with the electrode metal. This investigation also indicated that the various killing agents all have a greater affinity for oxygen than they do for nitrogen.

It was further found that the nitrides of aluminum and silicon have a boiling or sublimation temperature at around 2200° C.; that is, above the melting temperature of steel but below the boiling temperature of steel. These nitrides are vapors in the heat of the arc and condense on the relatively cool (1535° C. and below) molten weld pool and on the sides of the trough cut in the piece being welded by the electric arc. Immediately as these vapors condense in a very finely divided state, they react with the iron oxide on the surface of the molten weld pool to form an oxide of either aluminum or silicon, pure iron and pure nitrogen gas. This gas is released and trapped between the inter-face of the molten weld pool and the base of the trough and causes porosity in the rapidly cooling metal. Other killing agents having nitrides with similar low boiling temperatures are as follows: barium, beryllium, calcium, magnesium, strontium and lithium.

The killing agents having such low boiling temperature nitrides may be referred to hereinafter jointly as a sub-group as "vapor nitride killing agents."

This above theory is borne out by the fact that the nitrides of most of the remaining killing agents are solids or liquids at the boiling temperature of steel and are also insoluble in molten iron. Any nitrides formed by these killing agents have a much larger particle size and go into the molten weld pool where the amount of iron oxide present is less than on the surface. Reaction with the iron oxide is less likely and if it did occur would be much slower because of the particle size. In any event, these killing agents do not cause porosity. The nitrides when formed will either float to the top of the molten weld bead where they become a part of the slag and can be readily removed or they may be dispersed throughout the weld bead as tiny inclusions where they cause no more harm than the other non-metallic inclusions found in steel. These killing agents: namely, hafnium, zirconium, yttrium, scandium, titanium, boron, thorium, may be referred to hereinafter, as a sub-group, as "solid nitride killing agents."

Nothing is known of the nitride characteristics of the remaining killing agents and they are therefore not grouped.

As before indicated, non-porous weld beads have been obtained while welding in air using the ferro alloys of zirconium, titanium and boron. The remaining solid nitride killing agents have not been tried for obvious reasons such as their unavailability or extremely high cost. If the theories indicated are correct, however, they should work.

It may thus be pointed out that a further criterion of the killing agents for welding in air is that they must either form solid or liquid nitrides at the boiling temperature of steel or unstable nitrides at the melting temperature of steel. Silicon and aluminum and other vapor nitride killing agents are thus excluded if successful non-porous weld beads are to be obtained while welding in air without the protectors, etc., to be discussed hereinafter.

In accordance with one part of the invention, one or more solid nitride killing agents as above defined are fed into the arc simultaneously with the steel electrode in amounts to reduce enough iron oxide so that insufficient amounts remain to react with carbon in the period of time the weld bead is molten and cause porosity.

The various solid nitride killing agents mentioned are relatively expensive and in the amounts required adversely affect the ductility of the weld bead. It was reasoned that if some of the less expensive deoxidizers above mentioned were fed into the molten weld bead, they, in preference to the carbon, would reduce some of the iron oxide and thus make the work of the killing agent easier and require less killing agent for the same effect. The deoxidizers form oxides which are insoluble in molten steel, and if a sufficient amount is employed, a mass effect takes place wherein the deoxidizer reacts with the iron oxide before the carbon is able to. Once the reaction has occurred, the oxides precipitate out of solution and are not then readily available to be reduced by carbon.

Further, small amounts of some of the deoxidizers are considered desirable in the deposited weld bead even though the metal being welded does not contain such deoxidizers.

Thus, as a further part of the invention and, more preferably, one or more deoxidizers as above defined in amounts up to the maximum that can be tolerated in the deposited weld bead, and one or more solid vapor killing agents as above defined in amounts such that when considered in relation to the amount of deoxidizer employed, solid weld beads may be obtained, are fed into the arc along with the electrode.

It is to be noted that the killing agents and deoxidizers also tend to react with the oxygen of the air to form oxides. These oxides, with the exception of boron oxide, are all solids or liquids at the melting temperature of iron and will float to the top of the weld bead where they can be removed as a slag.

The formation of nitrides of the solid nitride killing agents or the formation of the oxides of the killing agents and the deoxidizers while not producing porosity is wasteful of expensive materials. Thus, "killing agent protectors" were sought in the form of a solid material which can be fed into the arc along with the electrode, which would protect the killing agents and deoxidizers from the atmosphere and either reduce or prevent their reaction to form either nitrides or oxides.

It was reasoned that if a material could be found which was (1) inert to both oxygen and nitrogen, and (2) capable of wetting molten metals, that such material might protect from both nitrogen and oxygen the molten metals as they moved through the arc to the weld pool.

Many of the halides of the alkali metals and the alkaline earth metals appeared to have characteristics which satisfied these requirements. Accordingly, tests were run using, among others, the fluorides of lithium, sodium, calcium and barium, in which tests it was found that the amount of deoxidizer and/or killing agent required for successful non-porous welds was substantially reduced. In addition, it was found that non-porous welds could be obtained while using vapor nitride killing agents, e.g. aluminum or silicon.

The boiling temperature of the above mentioned fluorides is above the melting temperature of steel.

Further tests with some of the other halides having a boiling temperature less than the melting temperature of steel, including potassium fluoride and sodium chloride, indicated that successful results could also be obtained if slightly greater amounts of such materials were employed. It is believed that all of the halides of the alkali and alkaline earth metals will work as "killing agent protectors." Aluminum fluoride also appears to be saisfactory.

One of the possible explanations of the success of the "killing agent protectors" may be obtained from a consideration of the temperature gradients from the center of an electric arc out to the atmosphere. Thus, in any arc there will be a central core which is at or above the boiling temperature of steel; that is, 3000° C. Outwardly from this core, the temperature decreases rapidly and if selected isothermals are plotted, there will be found a plurality of concentric cones of decreasing temperature outwardly of the core.

During welding, droplets of molten metal with a sheath of killing agent protector are continually formed on the electrode end and move through the core to the weld pool. During the short time interval that the droplets are forming, small portions thereof are heated to the boiling temperature and the resultant vapors expand outwardly from the central core through the isothermal cones. As they move outwardly, they condense and their volume collapses. In effect, a plurality of concentric sheaths of finely divided molten particles thus surround the arc and impede the movement outwardly of other vapors. This condensing and collapsing tend to crowd the materials into the central core and assist in excluding the air. It will also be noted that the air in order to reach the central portion of the arc must itself be heated which in effect cools the vaporous materials moving outwardly and these materials are then forced to condense.

Thus, if it be assumed a steel electrode is employed with manganese as a deoxidizer, silicon as a killing agent and lithium fluoride as a killing agent protector, the following general things will happen as the droplets form, begin to boil, partially vaporize and the vapors created expand outwardly from the core: the iron vapor moves outwardly and immediately commences to condense back to molten iron; the silicon vapor reaches the isothermal cone of approximately 2600° C., and begins to condense; the manganese vapor moves still further outwardly to the isothermal cone of approximately 1900° C., and begins to condense. It may alloy with the silicon and/or any molten iron particles present. The lithium fluoride vapor moves still further out to the cone of approximately 1676° C. where it begins to condense. The lithium fluoride condenses on and around any of the molten metallic particles there present to protect these particles from the oxygen and nitrogen. Beyond the 1676° C. cone, there will be a further area or sheath of liquid lithium fluoride particles outwardly to the solidification isothermal cone of approximately 870° C. which particles help to exclude air from the central core where most of the molten metal is moving from the electrode end to the weld pool.

It is to be noted that the portions of the killing agent protectors which do not boil away by the time the molten ingredients have reached the molten weld pool will be on the surface of the metal ingredients to protect them from contact with any molecules of air which might be present in the inner core.

The halides also appear to serve a second function; namely, they tend to dissolve any iron oxide with which they come in contact. Liquid iron oxide has a high surface tension and tends to cause the formation of large droplets of metal on the electrode end. Removal of the iron oxide results in smaller droplets which form faster and have less time to be exposed to the vaporizing effects of the arc or to the air.

Thus, it will be seen that the killing agent protectors appear to give a two-fold protection; namely, those portions which do not boil away coat the metallic particles of the central core to protect them from the atmosphere while the portions which boil form a vapor and liquid particle cone or shield around the arc in the vicinity of the isothermal cone where the metallic ingredients are solidifying; namely, around 1500° C.

If the above theories are correct, all of the halides of the alkali and alkaline earth metals should perform in accordance with the present invention although in varying degrees of effectiveness, which effectiveness can be measured by the amount of halide required to perform the desired function of protection.

The amount of killing agent protector required on a per-pound basis appears to vary by its (1) density, (2) the arc stabilizing ability of the alkali metal or alkaline earth metal forming the protector, and (3) its condensing temperature.

Lower density materials have larger volumes for a given weight and are able to coat greater surface areas of molten metal than ones with lesser volumes.

Arc stabilizing ability results in a longer arc for a given arc voltage and thus a greater surface area about the arc must be protected from the atmosphere. This requires more killing agent protector. Metals with such stabilizing ability are potassium, rubidium, cesium, strontium and barium. Further reference to arc stabilizing requirements will be made hereinafter.

Low condensing temperatures result in a greater diameter cone and thus larger surface areas around the arc where the protection is occurring and thus a greater volume of protector will be required. It is preferred that a halide be selected having a condensing temperature approximately equal to, or slightly greater than, the solidification temperature of molten iron. When a halide having a condensing temperature less than the solidification temperature of molten iron is employed, the halide will be a vapor at the 1500° C. temperature cone and the protection resulting from its condensing will not commence until a further outward cone is reached, thus requiring a greater volume of material. Its effect is similar to gas-shielding but more effective because of the condensing and collapsing effect closer to the arc core. Also, more of such halides boil away as the droplet is forming.

Factors covering the selection of a killing agent protector are (1) toxicity of the fumes resulting from any dissociation of the protector in the heat of the arc, (2) the solidification temperature, (3) the deliquescent or hydroscopic characteristics and (4) the cost.

Toxicity does not affect the ability of the protector to perform its function of protection but does render the material undesirable for use in general welding. If proper ventilation is used, however, the halides having high toxicity can be used. Because of the toxicity of both the bromides and the iodides, no tests have been run using these materials. Because their characteristics are the same as the fluorides and chlorides, it is believed that they would work satisfactorily.

The solidification temperature of the protector employed is important because of the effect it will have on the shape of the hardened weld bead. The protectors generally appear as a slag at the edges of the weld bead. If they have low solidification temperatures, they will be more liquid at the solidification temperature of molten steel and will enable the molten steel to flow freely as the weld bead is shaping. A low solidification temperature for the killing agent protector is desirable for this reason. Low solidification temperatures can ordinarily be obtained by employing mixtures of two or more halides or using a killing agent protector in combination with an iron oxide solvent as will be referred to hereinafter. As is known, the mixtures of various compounds together often result in a lower melting temperature for the mixture than for either of the compounds making up the mixture with the lowest melting temperature or solidification temperature being the "eutectic" mixture.

Hydroscopic or deliquescent characteristics of the killing agent protectors do not affect the ability of the material to form its protective function, but do result in an extreme and undesirable tendency to pick up water from the atmosphere when standing for even short times exposed to the atmosphere. Moisture in any form in the vicinity of the arc is undesirable. Thus, materials, having such characteristics when considered alone, are not preferred but if means can be provided to prevent these materials from coming into contact with the moisture of the atmosphere, they may be successfully employed. Deliquescent killing agent protectors, otherwise preferred, are calcium chloride, lithium chloride and potassium fluoride.

The cost of any ingredient which goes into an industrial process is also something which will effect whether the particular ingredient is a preferred ingredient or not. Thus, lithium fluoride is a preferred killing agent protector from a functional standpoint but its high cost at the time of the invention makes it impractical to employ in conventional industrial welding operations.

With the above factors in mind, the killing agent protector may be introduced into the arc in a variety of different forms; such as, in the form of a pure halide of an alkali metal or alkaline earth metal, or as a mixture of two or more. In this latter case, the melting and solidification temperature will be substantially reduced while the boiling temperatures remain essentially the same.

Alternatively, the killing agent protector may be introduced in the form of a double halide; such as, without limitation, $K_2SiF_6$, $K_2TiF_6$, $Na_2SiF_6$. These materials all have the characteristic of being able to break down in the heat of the arc to form both a halide as required by the present invention and a gas which assists in excluding the atmosphere from the arc. Thus, $K_2SiF_6$ breaks down into potassium fluoride and silicon tetrafluoride, a gas at room temperatures.

Mixed halides such as, without limitation MgClBr, or the like, are also within the scope of the invention.

It is also possible to use two or more compounds capable of reacting in the heat of the arc to form a halide within the scope of the invention, such compounds, without limitation, and their reaction being as follows:

$$Na_3AlF_6 + 6NaOH = Na_3[Al(OH)_6] + 6NaF$$
$$4Na_2CO_3 + Fe_3Br_8 = 8NaBr + Fe_3O_4 + 4CO_2$$

By using such double halides, mixed halides or compounds, which will form the desired halide in the heat of the arc, undesirable characteristics of the plain halide such as the deliquescence or hydroscopic characteristics or high cost, can be readily overcome or mitigated.

Thus, in accordance with the invention, a method of electric arc welding of steel in air is provided consisting of employing with the above-referred to deoxidizers, and killing agents, a killing agent protector selected from the class consisting of aluminum fluoride, the halides of the alkali metals and the alkaline earth metals or materials capable of breaking down or combining in the heat of the arc to form aluminum fluoride, or a halide of the alkali metals or the alkaline earth metals, all in such amounts as to be able to protect the deoxidizers and killing agents from the atmosphere and provide a solid weld bead.

In the course of experimenting with other materials which might possibly function either with or as a killing agent protector, it was found that silicon dioxide employed in conjunction with the killing agent protectors, above discussed, provided improved results and this result followed even though silicon dioxide when employed without the protectors was of no value. Thus, when silicon dioxide was employed, the transfer of metal from the electrode to the weld pool was much smoother. Less manganese, titanium, zirconium or boron were lost in transferring from the electrode to the weld bead. The silicon dioxide had no effect on the loss of silicon or aluminum.

While the exact reason for the improved performance with the silicon dioxide is not known, it is believed that the molten silicon dioxide reacts with the molten iron oxide on the surface of the droplet or on the surface of the molten weld pool to form a molten iron silicate, a liquid at the temperature of molten steel and quite stable in the presence of the deoxidizers and killing agents. The iron oxide is removed from availability for reaction with the deoxidizers or killing agents and thus less of these last-mentioned materials are required.

A further possibility is that the iron silicate being quite liquid, forms along with the halides a protective coating or bag around the molten droplets as they form and move from the electrode end to the molten weld pool.

Molten iron oxide has a high surface tension. Its effect is to cause relatively large droplets to form. Iron silicate, on the other hand, has a relatively low surface tension and a much higher fluidity at the molten temperature of steel so that smaller droplets form on the electrode end which pass through the arc to the weld bead more easily.

As another reason, silicon dioxide has a condensing temperature of approximately 2200° C. and will commence to condense on the molten metal particles in the various cones around the central core of the arc earlier than will the various halides above discussed.

It should also be noted that a mixture of silicon dioxide and a killing agent protector as above described has a lower melting temperature than either of the two materials while still having the same boiling or condensing temperatures, thus giving protection over a greater temperature range. Also the improvement in bead shape coming from using mixtures of halides also result.

Further tests indicated that aluminum oxide, titanium dioxide and zirconium dioxide could be substituted satisfactorily for the silicon dioxide. If these materials are satisfactory, then other materials having similar characteristics should also be satisfactory. Thus, it is believed that oxides of the elements of the class $R_2O_3$, $RO_2$ and the $R_2O_5$ elements as indicated in the periodic chart of the elements can also be substituted satisfactorily for the silicon dioxide, providing that the oxide has a boiling temperature of at least approximately 1500° C.

As the majority of such oxides are relatively expensive, and the first mentioned oxides appear to perform satisfactorily, no actual tests have been run on these other oxides. In the broader aspects, they are included in the invention. Silicon dioxide is preferred.

These oxides while appearing to function for a number of different reasons, appear to primarily function because of their ability to dissolve iron oxide and will hereinafter be referred to jointly as "iron oxide solvents."

Thus, in another and more narrow aspect of the invention, a method of electric arc welding of steel is provided wherein there is fed into the arc along with the deoxidizers, killing agent protectors above discussed together with iron oxide solvents selected from the class consisting of the $RO_2$, the $R_2O_3$ and the $R_2O_5$ oxides having a boiling temperature above approximately the melting temperature of steel.

When welding with D.C., it is desirable that as short an arc as possible be employed so as to cut down the surface area of the arc which must be protected from the air. Thus, halides of the metals having a high arc stabilizing ability are usually not employed in D.C. welding.

However, in the event that A.C. is employed to energize the arc, then means must be provided to prevent the arc from going out as the A.C. voltage crosses the zero axis. In this case, metals having high arc stabilizing abilities are preferably employed. Thus, compounds of potassium, rubidium, cesium, strontium and barium and particularly the titanates, silicates, zirconates, carbonates and aluminates of such metals are desirable and may be also fed into the arc along with the above-discussed ingredients. Potassium titanate is preferred.

It is believed that all the above-referred to ingredients may be fed into the arc along with the electrode in any desired manner, such as, where practical, coated on the electrode surface, alloyed with the electrode metal, or, and in accordance with a more limited aspect of the invention, in a cavity or cavities on the inside of the electrode. Thus, the electrode may be a hollow steel tube filled with the necessary ingredients.

The amount of ingredients required becomes less and less as the point at which the ingredients are fed into the arc approaches the center of the electrode end. By placing the ingredients on the inside of a hollow electrode tube, the same results may be obtained using the least amount of ingredients.

The weights of ingredients given hereinafter are based on a hollow electrode. The extremely small weights of ingredients are believed quite significant and an important discovery in the arc welding field. It is to be noted that small variations in the weights may have a large effect on the arc.

With a hollow tube electrode, it is preferred, in accordance with one aspect of the invention, that a substantial portion of the ingredients on the inside of the tube be metallic and capable of carrying electric current as well as making up a part of the molten metal droplet which forms on the electrode end. The ingredients, in accordance with the invention, include iron in the form of a solid material, such as a wire, a powder, or as the iron of a ferro alloy containing one or more of the deoxidizers or killing agents. By a substantial portion is meant that the iron on the inside of the electrode makes up from 10% to 55% of the total weight of the electrode. This iron, as it melts, assists in carrying the current from the point of energization to the arcing electrode end. The molten droplet of metal which forms is then symmetrical with reference to the axis of the electrode rather than being displaced to one side or the other such as would be the case if the ingredients on the inside of the tube were non-conductive and the arc would have to be maintained on the periphery of the electrode. The use of such electrically conductive material on the inside of the hollow tube is also extremely advantageous because the hollow electrode then looks to the arc like a solid electrode.

A further advantage of the electrically conductive material on the inside of the tube comes from the substantial increase in the bulk of such material, making it possible to completely fill the minimum cross-sectional area of opening which can be obtained in a hollow tube formed from a flat strip of material shaped into a tube and then drawn through sizing dies.

When a hollow tube is employed in accordance with the invention, the cross-sectional area of the interior of the tube is generally between 25% to 75% of the total electrode cross-sectional area; 30% is preferred.

Part of the weld metal to be deposited may be fed into the arc in an adjacent solid electrode of iron or steel. The use of two or more electrodes in multiple is described and claimed in U.S. Patent No. 2,721,249, dated October 18, 1955, and U.S. Patent No. 2,320,824, dated June 1, 1943, both assigned to the assignee of this application, and such two or more electrodes may be employed either in tandem or transverse to the line of the weld bead and either or both electrodes may be electrically energized. In the event that both are electrically energized, they may be energized from either the same or separate power sources.

The deoxidizers and the killing agents employed in accordance with the present invention are preferably added in the form of alloys, and particularly ferro alloys or alloys of themselves; for example, where both silicon and titanium are to be added, as a silico-titanium alloy. However, they may be added in whole, or part, in elemental form, or as alloys of the iron powder or as alloys of the steel of the electrode.

Alloys of these materials are generally much cheaper than the pure metal and appear to enter into the chemical reaction of the weld much more readily. Some of the killing agents, readily obtainable as a pure metal, such as aluminum, will not operate satisfactorily when added as a pure metal, and must be added as a ferro alloy. In this case, it is believed that the molten iron of the alloy protects the aluminum from the oxygen of the atmosphere.

The various alloys may contain variable percentages of the various deoxidizers or killing agents. In the examples to be given hereinafter, the amount of the alloy most commonly available and the cheapest is given. Alloys containing different percentages of the deoxidizer or killing agent may be substituted interchangeably providing the amount of the alloy employed is adjusted to correspond to the amount of deoxidizer or killing agent contained therein. In all instances, the iron of the ferro alloys enters into and becomes part of the weld metal.

The minimum amount of killing agent required is that necessary to react with the oxides formed during the welding operation and prevent porosity. This does not mean that all of the iron oxide must be reduced but only enough is reduced so that what remains is insufficient to react with the carbon in the brief period of time that the weld bead is molten to cause porosity. Under ideal conditions of a fully killed steel workpiece, free of any rust on the surface, these amounts are as follows:

|  | With killing agent protector | Without killing agent protector |
|---|---|---|
|  | Percent | Percent |
| Aluminum | 1 |  |
| Silicon | 1 |  |
| Zirconium | 3/4 | 2 1/4 |
| Titanium | 1/3 | 1 |
| Boron | 1/4 | 1/2 |

If two or more killing agents are used, the amount of each may be reduced proportionately.

The minimum amounts of killing agents must be increased when iron oxide is present on or in the workpiece before welding starts, which increase can be in part offset by the use of deoxidizers.

It may be generally stated that there is no upper limit on the amount of killing agent employed except the residual alloying effects on the weld bead resulting from using large amounts of killing agent. Excessive amounts of such agents usually result in undesirable physical characteristics of the weld bead, such as, brittleness, hardness, loss of ductility and the like. About 6% is the maximum usable amount.

The minimum amount of deoxidizer employed will depend upon that which is necessary to provide the desired final physical characteristics of the deposited weld bead and the maximum amount of deoxidizer will depend on that which can be tolerated in the weld bead.

With manganese, between 0.5% and 1.5% is considered the limits in the deposited weld bead for ordinary low-carbon steel. Most such steels commercially available today contain from between 0.3% to 0.5% manganese. If it be assumed that all the manganese fed into the arc turned up as an alloying ingredient in the deposited weld bead, then the amount of manganese which must be fed into the arc will be equal approximately to the amount of manganese in the workpiece plus approximately twice the desired increase in manganese over that originally in the workpiece. In actual practice, when using a killing agent protector about half of the manganese is lost so that the amounts of manganese employed must be proportionately increased. If an iron oxide solvent is employed, the amount of manganese lost is substantially reduced. Greater amounts of manganese are lost when iron oxide is present on or in the workpiece before welding starts and for commercial practice compensation for such oxide must be made by slightly increasing the manganese used. On the above figures, for normal welding about 1% to 3% manganese is preferably employed.

If chromium and vanadium are employed as the deoxidizer, the desirable and maximum amounts usually allowed in the deposited weld bead are between 0.25% and 0.5%. As the recovery of these materials is similar to manganese, the amounts necessary may be appropriately determined.

Even when using a killing agent protector, about half of the killing agent is lost. Silicon, which is the cheapest of the killing agents, has a maximum tolerance of about 0.5% in the deposited weld bead because of its embrittling effect. Thus, silicon should not normally be employed in amounts in excess of 2% of the weight of the electrode metal.

If a greater killing agent effect is desired than the tolerable amount of silicon will permit, then one or more of the other killing agents should be employed. In this respect, aluminum is an excellent killing agent. It is cheap and exerts a desirable grain-refining effect on the deposited weld bead. It can thus be tolerated in substantial amounts. Boron is expensive and its tolerance in the weld bead is low.

The amount of killing agent protector employed is that required to prevent the killing agent from coming into contact with the air and, of course, in this process it also prevents the deoxidizer and iron from coming into contact with the air. Depending upon the protector selected, the minimum amount required varies from 1% to 3% when no iron oxide solvent is employed and from ¾% to 2% when an iron oxide solvent is employed. Lithium fluoride because of its low density and other favorable characteristics has a minimum requirement in the lower ranges indicated while the other halides have a minimum requirement in the upper ranges indicated.

The iron oxide solvents and particularly silicon dioxide have a very substantial effect in relatively small amounts in reducing the losses of the killing agents and deoxidizers in transferring from the electrode to the weld pool. The increase in effect decreases as the amount of solvent is increased. The iron oxide solvent, when employed, should be present in minimum amounts of about ¼%. As the amount of solvent is increased beyond this amount, a point is reached where there is insufficient iron oxide to react with all of the solvent and the solvent appears as a liquid on top of the molten weld bead. As the solvents have a high melting temperature in relation to the melting temperature of steel and thus a low fluidity at the molten temperature of steel, they tend to adversely effect the shape of the weld bead. Generally, the maximum amount of iron oxide solvent; e.g. silicon dioxide is from 1% to 3%.

The arc stabilizing agents when employed are present in amounts which may vary from 1% to 8% depending upon the amount of the stabilizing need. In the lower ranges, little stabilization is obtained and in the upper ranges interference with the function of the killing agent protector commences.

In this respect, it should be poined out that the weight of non-metallic ingredients such as the killing agent protectors, the iron oxide solvents and the arc stabilizing agents, must be for the best results at least when a hollow tube electrode is employed, less than 10% of the total weight of the materials fed into the arc with the electrode.

One or more of the killing agents, deoxidizers or alloys thereof may be added as a wire or strip on the inside of the tube, but preferably all the various ingredients employed in accordance with the invention are ground fine, thoroughly intermixed and fed into the arc simultaneously with or in the electrode. Somewhat better protecting action is obtained if one or more of the killing agent protectors and iron oxide solvents are first mixed with one or more of the deoxidizers and killing agents, then heated to the melting temperature of the protector or solvent so that these materials melt and surround the other ingredients and are then allowed to cool. This hardened mixture is then ground to a fine particle size. It is found that the killing agent protector and solvent surround and coat the particles of the deoxidizers and killing agent protectors so that as these materials are projected into the arc, they are already in a protected condition. The iron powder can be included along with the deoxidizers and killing agents or separately, as desired.

The process of melting the killing agent protector and iron oxide solvent, cooling it and crushing it is more expensive than if the ingredients are mixed in dry form and fed into the arc in such form, but as indicated somewhat better results follow and somewhat less of the killing agent protector and iron oxide solvent can be employed.

The principal object of the invention is the provision of a new and improved electrode for electric arc welding wherein a bare metal electrode may produce good welds while welding in air.

Another object of the invention is the provision of a new and improved method and electrode for electic arc welding which does not require the use of a coating on the outside of the electrode, nor a granulated flux on the weld bead, nor an inert shielding gas.

Still another object of the invention is the provision of an electrode and method of arc welding which will simplify the art.

Another object of the invention is the provision of a new and improved electrode which can be used in automatic continuous welding which may be economically manufactured and easily used in the field.

Another object is the provision of a new and improved arrangement for protecting the metals transferring across the arc to the weld pool.

Another object is the provision of a hollow electrode having non-metallics and a high percentage of electrically conductive materials on the interior so that the electrode appears to the arc as a solid electrode.

Figure 2:
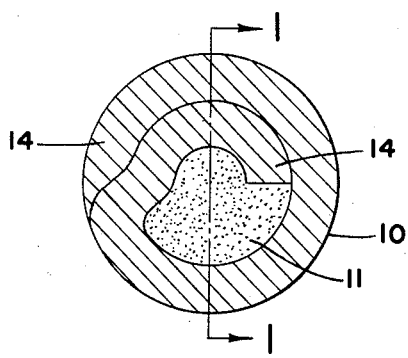
Figure 3:
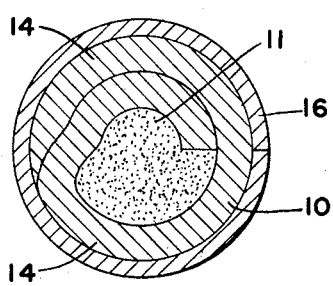

The invention may take physical form in certain steps and combination of steps and certain electrode constructions and materials to be used therewith all differing in appearance and arrangement one from the other. Preferred embodiments of the invention will be described in detail in this specification and illustrated in the accompanying drawing which is a part hereof and wherein:

Figure 1 is an enlarged side elevational view with portions broken away of an arc welding electrode embodying the present invention, Figure 2 is a cross-sectional view of Figure 1 taken approximately in line 2—2 thereof, Figure 3 is a cross-sectional view similar to Figure 1 showing an alternative embodiment of the invention.

Referring now to the drawings wherein the showings are for the purpose of illustrating a preferred embodiment of the invention only, and not for the purposes of limiting same, the figures show a welding electrode comprised of an elongated metallic member 10 having an interior space filled with materials 11 compounded in accordance with the present invention.

The member 10 is preferably in the form of a tube having a single continuous interior passage, although obviously a plurality of passages could be provided. The member 10 is preferably formed from a strip of flat material formed in the shape of a tube with the edges overlapping as at 14, 15. Obviously, the member 10 could be seamless tube or the edges could abut if desired. The edges need not be welded although they could be.

The member 10 is formed of the metal which it is desired to deposit in the weld bead, which for the welding of steel will be ordinary low-carbon, low-alloy steel. Obviously, if the non-ferrous metals are to be welded, the electrode will be formed of such non-ferrous metals, as are necessary to effect the weld.

Specific examples of the preferred composition of the material 11 expressed as a percentage of the weight of the completed electrode are as follows:

Example 1

| | Percent |
|---|---|
| Ferro titanium (40% Ti) | 1.0 |
| Ferro Manganese (85% Mn) | 2.0 |
| Sodium fluoride | 2.0 |
| Silicon dioxide | 1.0 |
| Iron powder | 25–30 |
| Electrode metal | Balance |
| | 100 |

Example 2

| | |
|---|---|
| Ferro titanium (40% Ti) | 2.5 |
| Iron powder | 10–50 |
| Electrode metal | Balance |
| | 100 |

Example 3

| | |
|---|---|
| Silico titanium (Si 43.5%) (Ti 45.5%) | 0.75 |
| Ferro titanium (43.8 Ti) | 1.0 |
| Ferro manganese (Mn 80%) | 2.0 |
| Sodium fluoride | 2.0 |
| Potassium fluoride | 2.0 |
| Iron powder | 15–30 |
| Electrode metal | Balance |
| | 100 |

Example 4

| | |
|---|---|
| Silico titanium (Si 43.5%) (Ti 45.5%) | 0.75 |
| Ferro titanium (Ti 40%) | 1.0 |
| Ferro manganese (86% Mn) | 2.0 |
| Sodium fluoride | 2.0 |
| Potassium silico fluoride | 2.0 |
| Potassium titanate | 1.0 |
| Iron powder | 12.0 |
| Electrode metal | Balance |
| | 100 |

Example 5

| | |
|---|---|
| Zirconium aluminum (Zr 55.4%, Al 36.8%) | 2.0 |
| Ferro manganese (Mn 80%) | 2.0 |
| Sodium fluoride | 2.0 |
| Titanium dioxide | 1.0 |
| Iron powder | 30.0 |
| Electrode metal | Balance |
| | 100 |

Still further workable embodiments of the invention are as follows:

Example 6

| | Percent |
|---|---|
| Ferro boron (B 15%) | 4.34 |
| Iron powder | 10–50 |
| Electrode metal | Balance |
| | 100 |

Example 7

| | |
|---|---|
| Ferro silicon (Si 50%) | 1.0 |
| Ferro manganese (Mn 85%) | 2.0 |
| Sodium fluoride | 2.0 |
| Silicon dioxide | 1.0 |
| Iron powder | 25–30 |
| Electrode metal | Balance |
| | 100 |

Example 8

| | |
|---|---|
| Ferro manganese (Mn 85%) | 2.0 |
| Ferro titanium (Ti 40%) | 1.5 |
| Sodium fluoride | 3.0 |
| Iron powder | 30.0 |
| Electrode metal | Balance |
| | 100 |

Example 9

| | |
|---|---|
| Ferro manganese (Mn 85%) | 2.0 |
| Ferro aluminum (Al 50%) | 2.5 |
| Sodium fluoride | 3.0 |
| Iron powder | 30.0 |
| Electrode metal | Balance |
| | 100 |

Example 10

| | |
|---|---|
| Ferro manganese (Mn 50%) | 2.0 |
| Ferro zirconium (Zr 50%) | 3.0 |
| Calcium fluoride | 3.0 |
| Iron powder | 30.0 |
| Electrode metal | Balance |
| | 100 |

Example 11

| | |
|---|---|
| Ferro manganese (Mn 85%) | 2.0 |
| Ferro silicon (Si 50%) | 3.0 |
| Lithium fluoride | 2.0 |
| Iron powder | 30.0 |
| Electrode metal | Balance |
| | 100 |

Example 12

| | |
|---|---|
| Ferro manganese (Mn 80%) | 2.0 |
| Ferro aluminum (Al 50%) | 1.75 |
| Barium fluoride | 2.0 |
| Silicon dioxide | 1.0 |
| Iron powder | 25–30 |
| Electrode metal | Balance |
| | 100 |

Example 13

| | |
|---|---|
| Ferro manganese (Mn 80%) | 2.0 |
| Ferro titanium (Ti 43.8%) | 2.0 |
| Sodium fluoride | 2.0 |
| Aluminum oxide | 1.0 |
| Iron powder | 25–30 |
| Electrode metal | Balance |
| | 100 |

Example 14

| | |
|---|---:|
| Ferro titanium (Ti 43.8%) | 4.0 |
| Sodium fluoride | 2.0 |
| Silicon dioxide | 1.0 |
| Iron powder | 5–25 |
| Electrode metal | Balance |
| | 100 |

Example 15

| | |
|---|---:|
| Silico titanium (Si 43.5%, Ti 45.5%) | 0.75 |
| Ferro titanium (Ti 43.8%) | 1.0 |
| Ferro manganese (Mn 80%) | 2.0 |
| Sodium fluoride | 2.0 |
| Potassium silico fluoride | 2.0 |
| Iron powder | 15–30 |
| Electrode metal | Balance |
| | 100 |

In these formulations, the iron powder, the electrode metal, and the iron of the ferro alloys, may be considered as the electrode metal to be deposited, while the remaining ingredients when employed serve as a deoxidizer, killing agent, killing agent protector, iron oxide solvent and arc stabilizer.

The above-referred to ingredients with the exception of the electrode metal are all preferably finely ground, thoroughly intermixed and placed on the interior of the hollow steel tube. Alternatively, the ferro alloys (and possibly the iron powder and silicon dioxide) may be intermixed with the halide and the mixture brought to a temperature where the halide melts. Thereafter the molten mixture is allowed to cool and, after cooling, is crushed to a fine particle size. This crushed mixture and the other ingredients are then mixed.

These ingredients are deposited upon a strip of steel which will form the member 10, in such amounts so that when the strip is formed into the tube, the ingredients will be present in the desired percentages above indicated. The rate of deposition of the powdered ingredients may be carefully controlled in relation to the rate of movement of the strip past the mechanism depositing the ingredients to provide a desired amount; or alternatively, an excessive amount of ingredients may be deposited on the strip and scraper means employed for the purpose of removing the excess.

The strip may, prior to the depositing of the powdered ingredients, be partly formed into a U-shape so as to better receive the ingredients. The strip may then be formed into a hollow tube by conventional methods with the edges either abutting or overlapping as shown. Thereafter, the formed hollow tube is passed through a sizing die which reduces the external diameter of the tube and, at the same time, compacts the powdered ingredients so that they will not separate or settle out and so that, in the event the end of the tube is opened, the material will not fall out. Obviously, to eliminate the possibility of any ingredients falling out, it is preferred that when the tube is cut to lengths that a pinching action be employed which will close both ends of the tube formed by the cut.

It is to be noted, however, that if the ingredients cannot be compacted during the course of manufacture, it is possible to heat the metal of the member 10 to a temperature sufficient to fuse the halide, or use some other binding ingredient such as pitch so that all of the ingredients will be held in place within the interior of the member 10.

When a welding operation is completed, a metallic bead will be formed on the end of the electrode which will close over the end of the tube; or alternatively, the ingredients will have been melted back a distance from the end of the tube and, as these ingredients harden, the end of the tube will thus be sealed.

The electrode may be of any desired diameter usable in electric arc welding from 1/16 of an inch to 1/4 of an inch and larger. The smaller sizes are more flexible, easily handled and are preferred. The smaller sizes indicated, however, must be formulated from extremely thin strips of metal and are thus somewhat difficult to handle during manufacture of the electrode. An electrode diameter of between the 3/32 and 1/8 of an inch has been found quite satisfactory in practice.

In accordance with the invention, the cross-sectional area of the interior of the member 10 is from 25% to 75% of the total electrode area. The minimum size of the opening must be that required to accept an amount of material 11 to properly function during the welding operation. From a practical standpoint, it is extremely difficult to form a tube by the methods above described having an interior opening of a smaller area than the minimum indicated. It is believed that if a smaller area opening can be obtained, that the iron powder may be eliminated. The use of the iron powder enables the bulk of the material 11 to be increased in an amount such that the interior of the member 10 will be entirely filled. Further, such iron powder is electrically conductive and as it melts, it helps to bridge over the open end of the member 10 so that the hollow electrode is presented to the arc as though it were a solid electrode. This is important in eliminating spatter and the like.

The use of powdered iron in amounts in excess of 10% is in accordance with certain aspects of the invention. Such powdered iron serves as a diluent for the other ingredients, makes proportioning of these ingredients in relation to the weight of the electrode metal more easily carried out in the course of manufacture and enables the internal area of the member 10 to be as large as indicated while still compacting all of the powdered ingredients into a solid compact body.

It is further preferred that the thickness of the strip from which the member 10 is made, be held relatively low, and if greater wall thicknesses of the member 10 are required, that a second layer 16 of electrode metal be applied over the member 10 substantially as is shown in Figure 3.

While various dimensions of the member 10 may be employed in accordance with the invention, preferred embodiments are as follows:

| Final outer diameter, inches | Strip width, inches | Thickness, inches | Percent area of opening |
|---|---|---|---|
| .175 | .520 | .032 | 41 |
| .153 | .460 | .025 | 37 |
| .120 | .410 | .020 | 28 |

It is also to be noted that the welding is preferably conducted at relatively high lineal speeds. In this way, the deposited weld bead congeals rapidly and as small amount of time as possible exists for the undesirable chemical reactions above-referred to take place.

The electrode end and the ingredients on the inside thereof all melt generally simultaneously. Droplets continuously form on the end of the member 10. These droplets are a mixture of the molten metal of the member 10 and the molten ingredients 11. The deoxidizer and killing agent mix readily with the metal of the member 10. The killing agent protector and iron oxide solvent do not mix with these metals and being of a lesser density flow to the outside where they coat the molten droplet. In coating the droplet, they protect the metals of the droplet from the atmosphere. Also, the iron oxide solvent and killing agent protector dissolve any iron oxide which might have formed on the surface of the droplet as it was melting. The surface of these droplets is brought rapidly to the boiling temperature and some of the killing agent protector and iron oxide solvent, together with some of the metals in the droplets are boiled away. The vapors formed move outwardly and condense as they reach the isothermal temperature zone corresponding to their condensing temperature. The outwardly moving vapors and the liquid particles formed thus serve to help keep the oxygen and nitrogen of the air away from the droplets. It is also to be noted that the iron oxide solvent and killing agent protector in dissolving the iron oxide have lowered the surface tension of the materials on the surface of the droplet and smaller droplets of molten metal thus result which move from the electrode end through the arc to the molten weld pool.

The deoxidizer when it reaches the molten weld pool immediately reacts with any iron oxide found to reduce the iron oxide to molten iron and an oxide of the deoxidizer. This oxide is insoluble in the molten iron and floats to the top. The killing agent also reacts with any iron oxide present to reduce such iron oxide to pure iron and an oxide of the killing agent. These oxides are all either solids or liquids at the melting temperature of iron and float to the top thereof where they can be removed as a slag. It is to be noted that the deoxidizer in the form of an oxide is a solid and does not readily give up its oxygen to any carbon in the steel and thus carbon monoxide is not formed. It is also to be noted that the killing agent has a greater affinity for oxygen than does carbon so that no reaction occurs between any oxide of the killing agent and the carbon in the molten weld metal.

In the preferred embodiments above described, the member 10 is bare. By "bare", however, it is not meant to exclude electrodes having thin, non-metallic coatings which can readily be pierced by conventional electrode energizing means.

Using the present invention and in particularly using the killing agent protectors, substantial decreases have been obtained in the loss of the deoxidizer and killing agent in moving across the arc to the molten weld pool. The invention is believed to have broader applications than simple to hollow tube electrodes as described with reference to the preferred embodiment.

Using the present invention, solid non-porous weld beads have been obtained while welding directly in air, that is, without any other external means for protecting the arc from the atmosphere. The invention does not, however, exclude the use of other protective means for the arc such as the inert gases, carbon dioxide, metallic vapors or, if desired, conventional electrode coatings on the outside of the electrode.

It will be appreciated that the electrode, even as described in the preferred embodiment, can be used in hand welding if desired.

The invention has been described with reference to preferred embodiments. Obviously, modifications and alterations will occur to others upon a reading and understanding of this specification and it is my intention to include all such modifications insofar as they come within the scope of the appended claims or their equivalents.

In the claims, whenever a percentage is indicated, such percentage is a percentage of the total amount of ingredients being fed into the arc in any given unit of time, or a percentage of the total electrode weight.

Having thus described our invention, we claim:

1. A method of electric arc welding of steel comprising: advancing an electrically energized steel electrode towards a workpiece while maintaining an arc between the electrode and the workpiece, simultaneously feeding into such arc one or more killing agents selected from the class of hafnium, lanthanum, the metals of the lanthanide series, zirconium, yttrium, scandium, beryllium, titanium, boron, aluminum, silicon, barium, calcium, magnesium, strontium, thorium, actinium, lithium, nepthunium, plutonium, radium, uranium, or alloys thereof in sufficient amounts that the iron oxide in the weld pool will be reduced by the killing agent in preference to the carbon, a killing agent protector selected from the class consisting of aluminum fluoride, the halides of the alkali metals and the alkaline earth metals and materials capable of breaking down or combining in the heat of the arc to form such halides in such amounts as to protect the killing agents from the oxygen and nitrogen of the atmosphere.

2. A method of claim 1 wherein iron powder is fed into the arc in amounts of from 10% to 50%.

3. An arc welding electrode capable of arc welding of steel comprising, in combination: a hollow steel tube having on the inside thereof one or more deoxidizers selected from the class consisting of manganese, chromium, niobium, tantalum, gallium, and vanadium, or alloys thereof in amounts, considering the loss in transferring, up to the maximum which can be tolerated in the weld bead, one or more killing agents selected from the class of hafnium, lanthanum, the metals of the lanthanide series, zirconium, yttrium, scandium, beryllium, titanium, boron, aluminum, silicon, barium, calcium, magnesium, strontium, thorium, actinium, lithium, nepthunium, plutonium, radium, uranium, or alloys thereof in amounts to reduce enough iron oxide so that insufficient remains to react with carbon in the period of time the weld bead is molten and cause porosity, and a killing agent protector selected from the class consisting of aluminum fluoride, the halides of the alkali metals and the alkaline earth metals and materials capable of breaking down or combining in the heat of the arc to form such halides in such amounts as to protect the killing agent from the atmosphere.

4. The combination of claim 3 wherein powdered iron in amounts of from 10% to 50% is also inside said tube.

5. A method of electric arc welding of steel comprising steps of feeding an electrically energized steel electrode towards a workpiece while maintaining an arc between the end of the electrode and the workpiece and simultaneously feeding into the arc one or more killing agents selected from the class of hafnium, lanthanum, the metals of the lanthanide series, zirconium, yttrium, scandium, beryllium, titanium, boron, aluminum, silicon, barium, calcium, magnesium, strontium, thorium, actinium, lithium, nepthunium, plutonium, radium, uranium, or alloys thereof in amounts to reduce enough iron oxide so that insufficient remains to react with carbon in the period of time the weld bead is molten and cause porosity, a killing agent protector selected from the class consisting of aluminum fluoride, the halides of the alkali metals and the alkaline earth metals and materials capable of breaking down or combining in the heat of the arc to form such halides, and iron oxide solvents selected from the class consisting of the $RO_2$, the $R_2O_3$ and the $R_2O_5$ oxides having a boiling temperature above 1535° C.

6. The combination of claim 5 wherein an arc stabilizing agent selected from the class consisting of the silicates, titanates, aluminates and zirconates of potassium, rubidium, cesium, strontium and barium are also fed into the arc.

7. An arc welding electrode comprised of a hollow steel tube having on the inside thereof a deoxidizer selected from the class consisting of manganese, chromium and vanadium in total amounts of from $\frac{1}{10}$% to 3%, a killing agent selected from the class consisting of zirconium, titanium and boron in amounts of from $\frac{1}{4}$% to 6%, a killing agent protector selected from the class consisting of the chlorides and fluorides of the alkali metals and the alkaline earth metals, aluminum fluoride and materials capable of breaking down or combining in the heat of the arc to form such halides in approximate amounts of between 1% and 10%.

8. The combination of claim 7 wherein said ingredients also include iron powder in amounts of from 10% to 50%.

9. The combination of claim 7 wherein said ingredients also include an iron oxide solvent selected from the class consisting of the oxides of silicon, aluminum, titanium and zirconium in amounts of approximately ¼% to 3%.

10. The combination of claim 9 wherein said ingredients include iron powder in amounts of from 10% to 50%.

11. The combination of claim 9 wherein said ingredients include an arc stabilizing agent selected from the class consisting of the silicates, titanates, aluminates and zirconates of potassium, rubidium, cesium, strontium and barium in amounts of from 1% to 8%, the total non-metallics not exceeding 10%.

12. An arc welding electrode comprised of a hollow steel tube having an interior filled with the following ingredients in amounts based on the total electrode weight: ferro titanium 1.0%, ferro manganese 2.0%, sodium fluoride 2.0%, silicon dioxide 1.0%, iron powder 25-30%, the balance being electrode metal.

13. An arc welding electrode comprised of a hollow steel tube having an interior filled with the following ingredients in amounts based on the total electrode weight: silico titanium .75%, ferro titanium 1.0%, ferro manganese 2.0%, sodium fluoride 2.0%, potassium fluoride 2.0%, iron powder 15-30%, the balance being electrode metal.

14. An arc welding electrode comprised of a hollow steel tube having an interior filled with the following ingredients in amounts based on the total electrode weight: silico titanium .75%, ferro titanium 1.0%, ferro manganese 2.0%, sodium fluoride 2.0%, potassium silico fluoride 2.0%, potassium titanate 1.0%, iron powder 12.0%, the balance being electrode metal.

15. An arc welding electrode comprised of a hollow steel tube having an interior filled with the following ingredients in amounts based on the total electrode weight: zirconium aluminum 2.0%, ferro manganese 2.0%, sodium fluoride 2.0%, titanium dioxide 1.0%, iron powder 30%, the balance being electrode metal.

16. An arc welding electrode comprising, in combination: a steel electrode member and one or more killing agents selected from the class of hafnium, lanthanum, the metals of the lanthanide series, zirconium, yttrium, scandium, beryllium, titanium, boron, aluminum, silicon, barium, calcium, magnesium, strontium, thorium, actinium, lithium, nepthunium, plutonium, radium, uranium, or alloys thereof and a killing agent protector selected from the class consisting of aluminum fluoride, the halides of the alkali metals and the alkaline earth metals, and materials capable of breaking down or combining in the heat of the arc to form such halides, the killing agents all being in finely ground form with one or a plurality of the particles of such killing agents being surrounded by a fused, hardened layer of the killing agent protector.

References Cited in the file of this patent
UNITED STATES PATENTS

| | | |
|---|---|---|
| 1,501,266 | Brace | July 15, 1924 |
| 2,109,708 | Pfister | Mar. 1, 1938 |
| 2,552,176 | Hummitzsch | May 8, 1951 |
| 2,694,763 | Muller | Nov. 16, 1954 |
| 2,702,281 | Gibb | Feb. 15, 1955 |
| 2,785,285 | Bernard | Mar. 12, 1957 |
| 2,817,751 | Phillips | Dec. 24, 1957 |
| 2,824,948 | Van Der Willigen | Feb. 25, 1958 |